United States Patent [19]

Tanaka et al.

[11] 4,290,927

[45] Sep. 22, 1981

[54] VULCANIZABLE POLYBLEND

[75] Inventors: Chiaki Tanaka, Chita; Masanobu Morikawa, Nagoya; Yoshio Kohno, Okazaki, all of Japan

[73] Assignee: Toray Industries, Inc., Tokyo, Japan

[21] Appl. No.: 140,888

[22] Filed: Apr. 16, 1980

Related U.S. Application Data

[63] Continuation of Ser. No. 585, Jan. 2, 1979, abandoned, which is a continuation of Ser. No. 745,928, Nov. 29, 1976, abandoned.

[30] Foreign Application Priority Data

Nov. 27, 1975 [JP] Japan .................................. 50/141175
Nov. 27, 1975 [JP] Japan .................................. 50/141176

[51] Int. Cl.$^3$ ........................ C08L 7/00; C08L 67/06
[52] U.S. Cl. ............................... 260/3; 525/165; 525/169; 525/171; 525/173; 525/177
[58] Field of Search ................ 260/3; 525/165, 169, 525/171, 173, 177

[56] References Cited

U.S. PATENT DOCUMENTS 3,963,802  6/1976  Shih .................................. 525/173
3,965,055  6/1976  Schichman et al. ................ 260/3

*Primary Examiner*—J. Ziegler
*Attorney, Agent, or Firm*—Miller & Prestia

[57] ABSTRACT

An intimate polyblend of about 5–90% by weight of a thermoplastic copolyester or block copolyester elastomer and about 95–10% by weight of a vulcanizable synthetic or natural rubber. The preferred copolyester is a copolyester of polybutylene terephthalate and the prefered block copolyetherester is polybutylene terophthalate-poly (tetramethylene oxide) glycol block copolyester. These polyblends can be vulcanized to elastomeric molded articles which exhibit an excellent oil and oxygen/ozone resistance even at elevated temperatures, a high impact strength, an increased scuff resistance and an improved flexibility at low and high temperatures. The vulcanized molded articles also have an improved adhesive property with polyester fibers or fabrics.

13 Claims, No Drawings

VULCANIZABLE POLYBLEND

This is a continuation of application Ser. No. 000,585, filed Jan. 2, 1979 which is itself a continuation of U.S. Ser. No. 745,928, filed Nov. 29, 1976, both now abandoned.

BRIEF SUMMARY OF THE INVENTION

The present invention relates to a vulcanizable polyblend comprising a thermoplastic copolyester and a synthetic or natural rubber. The present invention further relates to a vulcanized molded article which comprises an elastomeric intimate polyblend of a thermoplastic copolyester and a vulcanized synthetic or natural rubber.

Vulcanized natural or synthetic rubbers are widely used for a variety of purposes, such as tubings/hoses, tires, belts, coated fabrics and sealants in the automobile industry. Such rubbers, however, have various defects and have a restricted usage. For example, SBR (styrene-butadiene rubber) and NR (natural rubber) exhibit poor tensile and tear strength, and poor oil resistance. NBR (nitrile rubber) is comparably superior in oil resistance, but it is sensitive to oxygen or ozone at an elevated temperature. CR (chloroprene rubber) and EPDM (ethylene-propylene-diene rubber) has comparatively good resistance to deterioration caused by heat or oxygen, but they lose their elastomeric properties in certain oils such as ASTM #3 oil or Fuel D. Therefore, there has been needed a rubber having a good elastic property at both low and high temperatures, a good oil resistance, a good abrasion resistance and a good oxygen or ozone resistance.

Furthermore, recently polyester fibers or fabrics are popular as reinforcing materials because of their excellent rigidity and high modulus. It is strongly desired to improve the adhesive properties of rubbers to polyester. Thus, the principal object of this invention is to provide an elastomeric compound having good resilience at low and high temperatures, heat and oxygen/ozone resistance, excellent oil and fuel resistance, impact strength, good abrasion property and increased scuff resistance. In addition, the blends which are rich in the copolyester exhibit superior ozone resistance, oil and fuel resistance, improved stiffness, impact resistance and electric insulating properties, and the mechanical strength is maintained even at an elevated temperature. Another object of this invention is to provide a rubber composition having a good adhesive strength to polyester fibers or fabrics. We have found, the foregoing objects are achieved by blending a thermoplastic copolyester with a synthetic or natural rubber and vulcanizing the polyblend. It is a surprising discovery that copolyester or copolyester elastomer is so compatible with rubber than an intimate blend is achieved.

DETAILED DESCRIPTION OF THE INVENTION

The thermoplastic copolyesters useful for the polyblend of this invention include in general, linear saturated condensation products of diols and dicarboxylic acids, or reactive derivatives thereof and block copolyetheresters. Examples of the dicarboxylic acid are terephthalic acid, isophthalic acid, orthophthalic acid, azelaic acid, sebacic acid, adipic acid, dodecandicarboxylic acid, naphthalenedicarboxylic acid, cyclohexane dicarboxylic acid etc. Diols used in this invention are ethylene glycol, 1,4-butanediol, 1,2- or 1,3-propanediol, 1,6-hexanediol, xylylene diglycol, cyclohexane-dimethanol and 1,4-cyclohexane diol. Preferably, the copolyesters may be the condensation polymers prepared from a dicarboxylic acid component comprising 50–95 mol% of terephthalic acid and a glycol component comprising at least 50 mol% of 1,4-butanediol. More preferably the glycol component consists essentially of 1,4-butanediol. The block copolyetherester useful for the polyblend of this invention are generally produced by reacting at least one long chain glycol with at least one low molecular weight diol as mentioned above, and at least one dicarboxylic acid, as mentioned above. The long chain diols include poly(alkylene oxide)glycols wherein the alkylene group has 2–10 carbon atoms, such as poly(ethylene oxide)glycol
poly(propylene oxide)glycol
poly(ethylene-propylene oxide)glycol
poly(tetramethylene oxide)glycol
poly(hexamethylene oxide)glycol, and
poly(decamethylene oxide)glycol poly butadiene diol is also used as a long chain diol component. The long chain polyether glycol has a molecular weight of 400–6000, preferably 500–4500. Ratio of the short ester segment to the long ether segment is from 15/85 to 90/10. Preferably, they comprise polyhatylene terephthalate-poly(tetramethylene oxide)-glycol or polybutylene tere/iso phthalate-poly(tetramethylene oxide)glycol or polybutylene tere/ortho phthalate-poly(tetramethylene oxide)glycol. The copolyester or block copolyester elastomer may preferably have a relative viscosity of more than 1.2 measured by the standard method using 1.5 g of polymer per 100 ml of orthochlorophenol at 25° C. The copolyester or block copolyester elastomer may have a melting point of from 80°–220° C., preferably from 100°–200° C. vulcanizable rubbers used in the present invention include SBR, NBR, CR, EPDM rubber and natural rubbers. Preferably, nitrile rubber or chloroprene rubber are used. A nitrile rubber modified by copolymerizing $\alpha,\beta$-unsaturated carboxylic acid monomer may also preferably be used.

The polyblend of the present invention may comprise about 5 to 90% by weight of a thermoplastic copolyester and about 95 to 10% by weight of a vulcanizable synthetic or natural rubber. The preferred polyblend may comprise about 5 to 50% by weight of a thermoplastic copolyester and about 95 to 50% by weight of a vulcanizable synthetic or natural rubber. By using major amount of the rubber component a fine dispersion of copolyester component can be attained and a more excellent article can be obtained. The polyblend of copolyester and unvulcanized rubber may be prepared by merely mixing those components at a sufficiently elevated temperature to soften or melt them until a uniform blend is formed. It is important in order to obtain the best result that the size of the finely divided particles in the blend does not exceed 50μ preferably 10μ, which is easily achieved by the simple mixing of the components in this invention. Suitable mixing devices include heated rubber mills. "Banbury mixers" and/or extruders, preferably twin barrel extruders or single extruders fitted with a mixing attachment on the screw. The blending is also carried out by mixing the polyester emulsion with an unvulcanized rubber emulsion followed by coagulation of the mixed emulsion and then kneading the resultant solid portion at an elevated temperature. A vulcanizing agent may be added to the polyblend at any stage before vulcanization.

The polyblend can be injection-, compression-, transfer-, and blow-molded to form elastic molded articles after adding a vulcanizing agent. They can be also readily extruded to produce tubing, film and cross-head extruded for hose, wire, cable and laminates. They can also be easily calendered to produce films and sheeting, to produce calender coat woven and non-woven fabrics such as polyester fabrics or polyester tire cords. The molded or shaped articles are vulcanized under a conventional method and under a conventional condition for the rubber component contained in the polyblend. As a vulcanizing agent, zinc oxide, an oxide of a Group II metal of the Periodic Table, sulfur, an organic peroxide or their mixtures in combination with accelerators or retarders such as mercaproimidazoline, diorthotolyl guanidine, benzothiazyl disulfide, (zinc salt of) 2-mercaptobenzothiazole, tetramethylthiuram disulfide, tetramethylthiuram monosulfide, zinc diethyl dithio carbonate, ethylene thiourea and cyclohexyl benzothiazyl sulfonamide may be used in the present invention. Although the blend of this invention possesses many desirable properties, the composition may be stabilized against heat or oxygen/ozone or UV-radiation. This can be performed by the incorporation of stabilizers into the blend. Satisfactory stabilizers comprise phenols and their derivatives, amines and their derivatives, compounds containing both hydroxyl and amine groups, hydroxyazines, oximes, diarylosazones, diacetyl diarylosazones, N-substituted ureas, bisphenol sulfides, diamino durenes, p-alkoxy-N-akylanilines, benzophenones and benzotriazoles. Representative compounds useful as stabilizers include aldol-α-naphthyl amine, 1,2-dihydro-2,2,4-trimethylquinoline, N-isopropyl-N'-phenyl-p-phenylene diamine, phenyl-β-naphthyl amine, N,N'-diphenyl-p-phenylene diamine, N,N'-di-β-napht-hyl-p-phenylene diamine, 2,2'-methylene-bis (4methyl-6-t-butyl phenol), 2-mercaptobenzoimidazole, 6-ethoxy-1,2-dihydro-2,2,4-trimethylquinoline, N-isopropylxanthate, 1,3-dibutylthiourea. The properties of the composition can be moldified by incorporation of various conventional inorganic fillers, such as carbon black, zinc oxide, titanium oxide, silica gel, aluminum oxide, whisker, wallastenite clay and glass fiber. The composition may also contain various additives such as plasticizer, pigments, flame retardants, nucleating agents, and blowing agents. The vulcanized elastomeric molded articles of the present invention may be economically and practically applied to a variety of purposes, such as a tubing, hose, tire, belt, wire coating, shock-absorber, acoustical sealant, electric insulator, coated fabric, sealant, O-ring, shoe soling, heel lift, packaging materials, flooring materials, roofing materials, automotive applications, factory applications and gears.

The following examples further illustrates the invention.

EXAMPLE 1

Copolyester (A)

In a glass flask having stainless steel stirrer with helical ribbon type screw, 94.5 parts of dimethyl terephthalate, 41.5 parts of dimethyl isophthalate, 94.5 parts of 1,4-butanediol and 62.0 parts of poly(tetramethylene oxide)glycol having a molecular weight of about 1000 were placed in the presence of 0.10 parts of tetrabutyl titanate. The mixture was heated with stirring at 210° C. for 2 hours to distill off methanol from reaction system. The recovered methanol was 42.6 parts corresponding to 95% of the theoretical weight. After adding 0.42 parts of "Irganox"1098 to the reaction mixture, the reaction temperature was then raised to 245° C. and the pressure on the system was reduced to 0.2 mmHg for a period of 50 minutes. Polymerization was continued for 2 hours under these conditions. The intrinsic viscosity of the product in orthochlorophenol at 25° C. was 1.05 and the polymer showed a melting point of 160° C.

Copolyester (B)

Using 199 parts of dimethyl terephthalate, 216 parts of 1,4-butanediol and 200 parts of poly(tetramethylene oxide)glycol under the same reaction conditions as in copolyester A), copolyester (B) was prepared. The copolyester (B) exhibits a melting point of 201° C. and an intrinsic viscosity of 1.50.

Elastomer Compositions

Blends of copolyester (A) or (B) with some types of unvulcanized rubbers were prepared in the following blend ratios using an extruder (having 30 mm φ screw) and heated at 200° C. After mixing, the desirable vulcanizing agents, vulcanizing auxiliary agents and vulcanization accelerators were added to the blended rubber on a roller mill at from 70°–80° C., the vulcanization was performed at a temperature of from 140°–150° C. for 30 minutes using a press mold. Typical properties of these blends were listed in Table 1 in comparison with unblended rubbers.

TABLE 1

| Number | Example | | | | | | | | Control | | | |
|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 |
| Copolyester | A | A | A | A | A | A | B | B | — | — | — | — |
| Rubber | SBR[*1] | SBR | SBR | NBR[*2] | CR[*3] | EPDM[*4] | NBR | SBR | SBR | NBR | CR | EPDM |
| Blend ratio (copolyester/rubber) | (75/25) | (50/50) | (25/75) | (25/75) | (25/75) | (25/75) | (50/50) | (50/50) | (0/100) | (0/100) | (0/100) | (0/100) |
| Thermal Resistance[*5] (%) | 98 | 90 | 77 | 90 | 82 | 88 | 95 | 93 | 36 | 56 | 53 | 79 |
| UV Resistance[*6] (%) | 98 | 82 | 61 | 55 | 70 | 72 | 62 | 86 | 25 | 20 | 65 | 58 |
| Oil Resistance[*7] (%) | 6 | 14 | 16 | 10 | 16 | 23 | 6.8 | 9.9 | 44 | 14 | 21 | 51 |
| Compression Set[*8] (%) | 10 | 12 | 13 | 12 | 6.8 | 16 | 8.4 | 10 | 15 | 11 | 6.3 | 17 |

TABLE 1-continued

| Number | Example | | | | | | | | Control | | | |
|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 |
| Durometer Hardness*9 A | 62 | 61 | 58 | 56 | 59 | 62 | 61 | 60 | 58 | 50 | 55 | 63 |

*[1]SBR: Nippon Zeon "Nipol" 1502
*[2]NBR: Nippon Zeon "Nipol" 1043
*[3]CR: Du Pont "Neoprene" GNA
*[4]EPDM: Du Pont "Nodel" 1040
*[5]Thermal Resistance: Retention of elongation at break after aging at 100° C. for 10 hours in gear oven.
*[6]UV Resistance: Retention of elongation at break after UV irradiation at 50° C. for 50 hours in Phade-O-Meter.
*[7]Oil Resistance: Weight increasing rate after immersion to ASTM No. 3 Oil at 100° C. for 50 hours.
*[8]Compression Set: ASTM B-Method, 100° C., 70 hours.
*[9]Durometer Hardness: ASTM D-2240

EXAMPLE 2

With 60 parts of copolyester (A) were mixed 40 parts of SBR, 5 parts of zinc oxide, 2 parts of stearic acid and 20 parts of carbon black on a Banbury mixer at 180° C. for 10 minutes. Then 2 parts of sulfur and 2.5 parts of benzothiazyldisulfide were added to the mixture on a rubber roll heated at 70° C. A portion was then molded and vulcanized at 150° C. under a pressure of 50 kg/cm² for 30 minutes. This vulcanized compound blend showed good elastic properties as listed in Table 2.

TABLE 2

| Physical Properties | | Test Method |
|---|---|---|
| Tensile Strength (kg/cm²) | 450 | ASTM D-412 |
| Elongation at Break (%) | 430 | D-412 |
| Tensile Set (%) (100% Strain) | 27 | D-412 |
| 100% Modulus (kg/cm²) | 80 | D-797 |
| 300% Modulus (kg/cm²) | 140 | D-797 |
| Durometer Hardness | 88A | D-2240 |

EXAMPLE 3

By mixing 60 parts of SBR (Nippon Zeon "Nipol" 15024 with 40 parts of block copolyetherester (B) by a twin-screw extruder having 45 mm screws at 200° C., a finely mixed blend was prepared. To 100 parts of the blend, 4 parts of zinc oxide, 1 part of stearic acid, 10 parts of MPC black, 1.5 parts of sulfur and 1.5 parts of DM were added on a rubber mill at a temperature of 80° C., and then the compound was molded and vulcanized at 150° C. for 30 minutes. The properties of the resulting rubber blend are shown in Table 3 in comparison with four control rubber compositions.

Control 1
SBR having no copolyester components.
Control 2
The blend without the process of extrusion: Block copolyetherester (B) was blended with SBR and the same vulcanizing agents on a rubber mill. In this case, copolyetherester (B) did not finely disperse into the SBR matrix and formed a macro domain of about 50µ. Consequently the blend showed poor mechanical properties.

Control 3
Blend of blockcopolyetherester with previously vulcanized SBR: When 40 parts of block copolyetherester (B) was blended with 60 parts of previously vulcanized SBR using an extruder heated at 200° C., the compatibility between the two components was too poor to form a finely divided structure. The mixture was press-molded to prepare test pieces.

Control 4
Polybutylene terephthalate having an intrinsic viscosity of 1.2 was used in place of block copolyetherester (B) in Example 3. Blending was performed in the similar manner except at 240° C., and the resulting rubber blend showed a macro phase separation and poor elastic properties.

TABLE 3

| Composition | Example 3 (B)/SBR (40/60) | Control | | | |
|---|---|---|---|---|---|
| | | 1 SBR (0/100) | 2 (B)/SBR (40/60) | 3 (B)/SBR (40/60) | 4 polybutylene terephthalate/ SBR (40/60) |
| divided state (divided particle size) | <<50µ (1-10µ) | — | >>50µ | >>50µ | >50µ |
| Tensile Strength (kg/cm²) | 200 | 110 | 120 | 140 | 400 |
| Elongation at Break (%) | 460 | 600 | 50-300 | 25-400 | 30 |
| Shore Hardness A | 62 | 60 | 60-70 | 59-75 | 95 |
| Compression Set (%) (100% Strain) | 15 | 16 | 40 | 45 | 53 |
| Thermal Resistance at 100° C. | O | X | O | O | O |

EXAMPLE 4

Substantially following the procedures described in Example 1, a block copolyetherester (C) was prepared from the following materials.

| Terephthalic acid | 162 parts |
|---|---|
| Isophthalic acid | 87 parts |
| 1,4-Butanediol | 240 parts |
| Poly(tetramethylene oxide)glycol, number average molecular weight 1000 | 130 parts |

70 parts of "Hycar" 1072, nitrile rubber having pendant carboxylic groups prepared from 27% of acrylonitrile, 71% of butadiene, 2% of acrylic acid and 30 parts of copolyetherester (C) was blended in a 30 mmφ extruder heated at 200° C., and an almost transparent blend was prepared. To 100 parts of the blend were added 5 parts of zinc oxide, 1 part of stearic acid, 0.5 parts of sulfur, 1 part of cyclohexylbenzothiazyl sulfonamide (CZ) and 2 parts of tetramethylthiuram disulfide (TT) and kneaded on a rubber roller mill. Portion of the compound was then molded and vulcanized at 155° C. under a pressure of 50 kg/cm² for 30 minutes. For comparison nitrile rubber having no copolyetherester was prepared.

TABLE 4

| Composition | Example 4 copolyester(C)/ nitrile rubber (30/70) | Control nitrile rubber |
|---|---|---|
| Tensile Strength (kg/cm²) | 150 | 38 |
| Elongation at Break (%) | 380 | 330 |
| Tensile Set (%) (100% Strain) | 4.0 | 4.5 |
| 100% Modulus (kg/cm²) | 120 | 84 |
| After Aging at 100° C. for 50 hr | | |
| Tensile Strength (kg/cm²) | 150 | 21 |
| Elongation at Break (%) | 340 | 190 |
| 100% Modulus (kg/cm²) | 125 | 130 |
| Weight Increase after oil absorption (%) | | |
| ASTM No. 3 oil 70° C. × 50 hr | 17 | 24 |

EXAMPLE 5

In the similar manner as in Example 1, copolyester (D) was prepared from the following materials.

| Dimethyl terephthalate | 126.1 parts |
|---|---|
| Dimethyl isophthalate | 67.9 parts |
| 1,4-Butanediol | 270 parts |

The copolyester (D) has a melting point of 168° C. and an intrinsic viscosity of 1.23. Seventy five parts of SBR ("Nipol" 1052) and 25 parts of copolyester (D) were subjected to a melt-compounding procedure by a 30 mmφ extruder heated at 200° C. A blend in which copolyester (D) particle was dispersed finely at about from 1-5 microns was prepared. To 100 parts of the blend were mixed 5 parts of zinc oxide and 2 parts of stearic acid on a Banbury Mixer for 30 minutes, and then 2 parts of sulfur and 2.5 parts of benzothiazyl disulfide were added and the mixture was kneaded on a rubber roll mill heated at 70° C. The resulting blended composition was molded and vulcanized at 150° C. under the pressure of 50 kg/cm² for 30 minutes. Test specimens were subjected to some tests listed in Table 5 with the test values therefor.

TABLE 5

| | Example 5 | Control Copolyester(D) | SBR |
|---|---|---|---|
| Tensile Strength (kg/cm²) | 170 | 590 | 150 |
| Elongation at Break (%) | 780 | 320 | 750 |
| Tensile Set (%) (100% Strain) | 19 | 90 | 15 |
| 300% Modulus (kg/cm²) | 52 | 3,000 | 40 |
| Shore Hardness | 70A | 60D | 56A |
| After Aging at 100° C. for 7 hr | | | |
| Tensile Strength (kg/cm²) | 150 | 610 | 85 |
| Elongation at Break (%) | 576 | 270 | 310 |
| Shore Hardness | 73A | 60D | 74A |

EXAMPLE 6

In the manner described in Example 1 copolyester (E) was prepared from the following materials.

| Dimethyl terephthalate | 113.5 parts |
|---|---|
| Dimethyl phthalate | 61.1 parts |
| 1,4-Butanediol | 121.5 parts |

The copolyester (E) exhibits a melting point of 170° C. and an intrinsic viscosity of 1.30. Seventy parts of nitrile rubber ("Hycar" 1042) and 30 parts of copolyester (E) were blended by a 30 mmφ extruder heated at 210° C. To 100 parts of the blend were added and mixed 5 parts of zinc oxide, 1 part of stearic acid, 25 parts of MPC black, 2 parts of sulfur and 1.5 parts of tetrathiuram disulfide on a rubber roll mill at 70° C., and the portion was molded and vulcanized at 150° C. for 30 minutes. For comparison a composition, of which copolyester component was added and kneaded along with above mentioned additives on a rubber roll mill heated at 70° C., was prepared and tested.

TABLE 6

| Composition | Example 6 Copolyester (E)/NBR (30/70) | Control Copolyester (E)/NBR (30/70) | NBR (100) |
|---|---|---|---|
| Mixer for copolyester blend | Extruder heated at 210° C. | Roll heated at 70° C. | — |
| Particle size of copolyester in NBR matrix | <50μ (1-10μ) | >>50μ | — |
| Tensile Strength (kg/cm²) | 420 | 210 | 250 |
| Elongation at Break (%) | 400 | 100-400 | 300 |
| JIS Hardness | 71A | 40-96A | 67A |
| Oil Resistance | excellent | good | good |
| Abrasion Resistance | excellent | good | good |
| Ozone Resistance | good | poor | poor |
| Adhesion to polyethylene terephthalate fabrics | excellent | poor | poor |

What we claim is:

1. A vulcanizable polyblend which comprises an intimate mixture of about 5 to 90% by weight of a thermoplastic polyester which is a condensation polymer prepared from a dicarboxylic acid and a glycol component comprising at least 50 mol percent of 1,4-butanediol, the remainder of said glycol component being selected from the group consisting of ethylene glycol, propanediols, 1,6-hexanediol, xylylene glycol, cyclohexane dimethanol and 1,4-cyclohexanediol; said polyblend also comprising 95 to 10% by weight of a vulcanizable rubber.

2. A vulcanizable polyblend as defined in claim 1 wherein said dicarboxylic acid component comprises at least one member selected from the group consisting of terephthalic acid, isophthalic acid, and orthophthalic acid.

3. A vulcanizable polyblend as defined in claim 2 wherein said dicarboxylic acid component comprises a mixture of terephthalic acid and isophthalic acid.

4. A vulcanizable polyblend as defined in claim 2 wherein said dicarboxylic acid component comprises terephthalic acid and orthophthalic acid.

5. A vulcanizable polyblend as defined in claim 2 wherein said dicarboxylic acid component comprises a mixture of terephthalic acid and isophthalic acid and wherein said glycol component consists essentially of 1,4-butanediol.

6. A vulcanizable polyblend as defined in claim 2 wherein said dicarboxylic acid component comprises a mixture of terephthalic acid and orthophthalic acid and wherein said glycol component consists essentially of 1,4-butanediol.

7. A vulcanizable polyblend as defined in claim 2 wherein said glycol component consists essentially of 1,4-butanediol.

8. A vulcanizable polyblend as defined in claim 1 wherein the rubber comprises styrene-butandiene rubber.

9. A vulcanizable polyblend as defined in claim 1 wherein the rubber comprises nitrile rubber.

10. A vulcanizable polyblend as defined in claim 1 wherein the rubber comprises chloroprene rubber.

11. A vulcanizable polyblend as defined in claim 1, wherein the rubber comprises ethylene-propylene-diene rubber.

12. A vulcanizable polyblend as defined in claim 1 wherein the rubber comprises natural rubber.

13. A vulcanizable polyblend as defined in claim 1 wherein the amount of said polyester is 5–50% by weight and that of the vulcanizable rubber is 95 to 50% by weight.

* * * * *

UNITED STATES PATENT AND TRADEMARK OFFICE
CERTIFICATE OF CORRECTION

PATENT NO. : 4,290,927
DATED : September 22, 1931
INVENTOR(S) : Chiaka Tanaka et al It is certified that error appears in the above-identified patent and that said Letters Patent are hereby corrected as shown below:

Column 2, line 23, "poly" should read --Poly--
line 37, "vul" should read --Vul--
line 62, after "mills" delete the period and insert a comma .

Column 5, line 53, "15024" should read --1502--
line 55, "45 mm" should read --45 mm$\phi$--

Signed and Sealed this

Thirtieth Day of November 1982

[SEAL]

Attest:

Attesting Officer

GERALD J. MOSSINGHOFF
Commissioner of Patents and Trademarks